(12) United States Patent
Tsao et al.

(10) Patent No.: US 6,705,732 B2
(45) Date of Patent: Mar. 16, 2004

(54) POLARIZER MODULE

(75) Inventors: Chien-Ming Tsao, Hsin-Chu (TW); Chih-Chung Kang, Hsin-Chu (TW); Bor-Bin Chou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 10/249,952

(22) Filed: May 22, 2003

(65) Prior Publication Data

US 2003/0218722 A1 Nov. 27, 2003

(30) Foreign Application Priority Data

May 24, 2002 (TW) ........................... 91207886 U

(51) Int. Cl.$^7$ .............................................. G03B 21/18
(52) U.S. Cl. .......................... 353/61; 349/58; 353/60; 353/119; 353/20; 359/820
(58) Field of Search ............................ 353/20, 60, 61, 353/122; 349/58; 359/512, 820; 348/748; 352/248

(56) References Cited

U.S. PATENT DOCUMENTS 6,639,743 B2 * 10/2003 Watanabe .................. 359/820

* cited by examiner

*Primary Examiner*—Russell Adams
*Assistant Examiner*—Michael Dalakis
(74) *Attorney, Agent, or Firm*—Winston Hsu

(57) ABSTRACT

The present invention comprises a polarizer adhered on a flange plate at the top end of a L-shape base, an aslant surface on one side of the base, two sleeve screws protruded from the center of the aslant surface, an air duct defined between an upper base and a lower base of a Z-shape fixed base, two slots disposed on the lower base for receiving the sleeve screws, and two fixing bolts securing the washers onto the sleeve screw to limit the fixed base on the aslant surface of the base. A supporting surface is formed at a flange disposed downward at both ends of the upper base of the fixed base for gluing a half-wave plate. An adjusting mechanism protruded from the lower side of the fixed base extends into a recess at the lower end of the aslant surface; a screw hole is disposed on a side of the base and having an adjusting slot with its end propping one side of the adjusting mechanism; and an elastic member with its ends respectively fixed to a side of the base and a hole of the adjusting mechanism. The adjusting mechanism at the lower side of the fixed base adjusts the half-wave plate to an optimal polarized position.

8 Claims, 6 Drawing Sheets

POLARIZER MODULE

BACKGROUND OF INVENTION

1. Field of the Invention

The present invention relates to an optical engine of a projection display device, more particularly, to a polarizer module in an optical engine.

2. Description of the Prior Art

As the science and technology develop rapidly, projection display devices are applied in different areas such as the projection display in a big meeting, commercial projection screen or television, and works with the contents of brief report for an instant diagrammatic screen display. To provide a high brightness and clear image of the projection on screen, the projection display device generally uses a high-power light bulb as the projecting light source. However, using a high-power light bulb will cause the problem of generating high temperature. Therefore, the way of quickly assembling the projection display device and effectively dispersing heat to avoid deterioration to the function of the optical components due to the high temperature and enhancing the product quality and competitiveness become the subjects of research and development in the industry.

FIG. 1 shows an imaging assembly 10 of a prior-art projection display device. A projecting lamp (not shown in the figure) is installed under the imaging assembly 10 for producing a white light beam. The white light beam is separated into three colored light which are red, green and blue by the X-plate 12 in the external casing 11 of the imaging assembly 10. Each separated colored light is guided into three polarizer modules 13 that are comprised of a polarizer and a half-wave plate, and three modulation units that are composed of three light valves 14 for modulation. Then, each modulated light is passing through a X-cube 15 for light combination, and is projected onto a screen by a projection lens (not shown in the figure) at the front end of the X-cube 15. In addition, two fans 16 are disposed in the intervals of the three light valves 14 on the side of the external casing 11 for dispersing heat.

As shown in FIGS. 2 and 3, the prior-art polarizer module 13 has an aslant surface 1311 on a L-shape base 131, and a polarizer 132 adhered onto a concave surface 1313 at the top of the aslant surface 1311, and two fixing bolts 133 passing two slots 134 to fix a fixed base 135, a half-wave plate 136 disposed at a concavesurface 1351 on the top of a fixed base 135 corresponsive to the concave surface 1313, and a block 137 protruded from the center of the lower side of the fixed base 135 and embedded into a recess 1312 at the center of the lower end of the aslant surface 1311. By means of the rotation of adjusting bolts 138 on both sides at the bottom end of the aslant surface 1311, the block 137 is pushed sideway to drive the half-wave plate 136 on the fixed base 135 to make a planar angle adjustment for searching for the optimal polarization effect. Finally, the fixing bolt 133 secures the fixed base 135 into position. However, the distance between the half-wave plate 136 and the polarizer 132 of the prior-art polarizer module 13 is too close, the heat dispersion effect is poor, and thus will shorten the life of the polarizer module 13. Further, the half-wave plate 136 needs to simultaneously adjust the adjusting bolts 138 on both sides to complete the positioning, not just wasting time, but also very inconvenient. In addition, the half-wave plate 136 and the polarizer 132 are only supported by the two dimensional concave surfaces 1313, 1351, and it is difficult to accurately align them for gluing. Furthermore, a special sectional bolt is used for the fixing bolt 133 to avoid affection to the positioning of the half-wave plate 136, which also increases the complexity of the components. Therefore, the prior-art polarizer module 13 still has several shortcomings that require improvements.

SUMMARY OF INVENTION

An object of the present invention is to provide a polarizer module to increase the distance between the half-wave plate and the polarizer for improving the ventilation and heat dispersion effects, and extending the lifetime.

Another object of the present invention is to provide a polarizer module to increase the supporting surface, such that the half-wave plate and the polarizer can be positioned accurately for easy installation by gluing.

Another object of the present invention is to provide a polarizer module to simplify the adjusting operation and save the assembling time by using a single adjusting bolt to adjust the position of the half-wave plate.

Another further object of the present invention is to provide a polarizer module by using simple screws and washers to avoid affections to the adjustment to the positioning of the half-wave plate and simplify the complexity of components.

To achieve the foregoing objectives, the present invention comprises a polarizer adhered on a flange plate at the top end of a L-shape base, an aslant surface on one side of the base, two sleeve screws protruded from the center of the aslant surface, an air duct defined between an upper base and a lower base of a Z-shape fixed base, two slots disposed on the lower base for receiving the sleeve screws, and two fixing bolts securing the washers onto the sleeve screw to limit the fixed base on the aslant surface of the base. A supporting surface is formed at a flange disposed downward at both ends of the upper base of the fixed base for gluing a half-wave plate. An adjusting mechanism protruded from the lower side of the fixed base extends into a recess at the lower end of the aslant surface; a screw hole is disposed on a side of the base and having an adjusting slot with its end propping one side of the adjusting mechanism; and an elastic member with its ends respectively fixed to a side of the base and a hole of the adjusting mechanism. The adjusting mechanism at the lower side of the fixed base adjusts the half-wave plate to an optimal polarized position.

DETAILED DESCRIPTION

Further features and advantages of the present invention, as well as the structure and operation of the embodiments of the present invention, are described in detail below with reference to the accompanying drawings.

Figure 1:
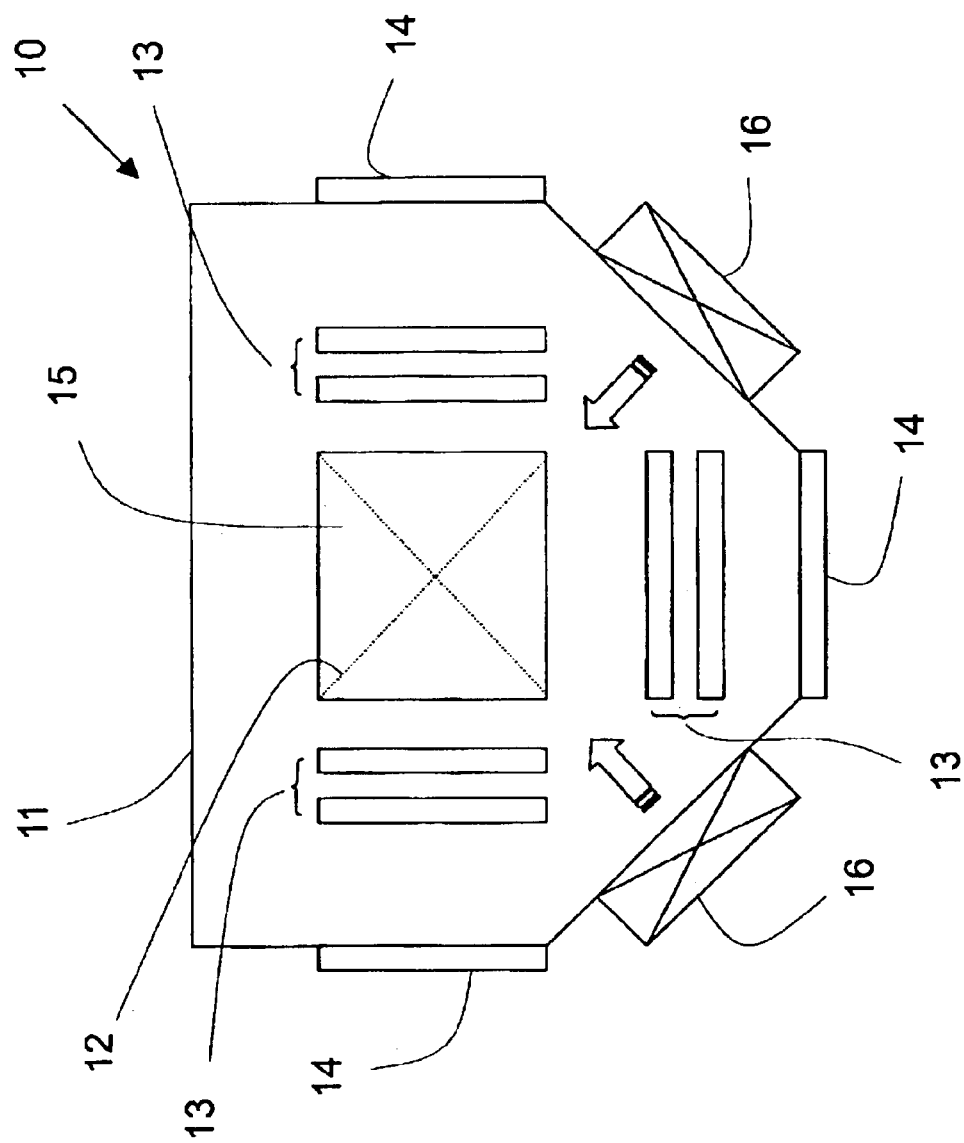
FIG. 1 is a cross-sectional diagram of the imaging assembly according to a prior-art projection display device.
Figure 2:
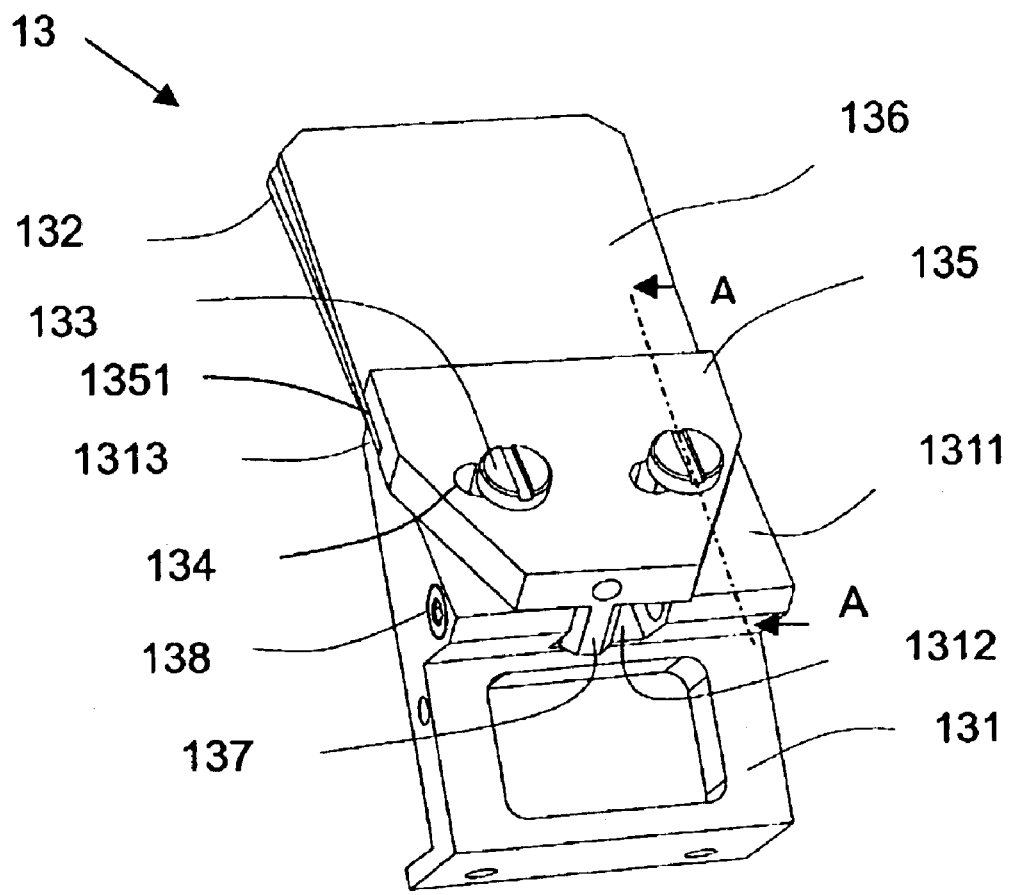
FIG. 2 is a perspective view of the polarizer module according to a prior art.
Figure 3:
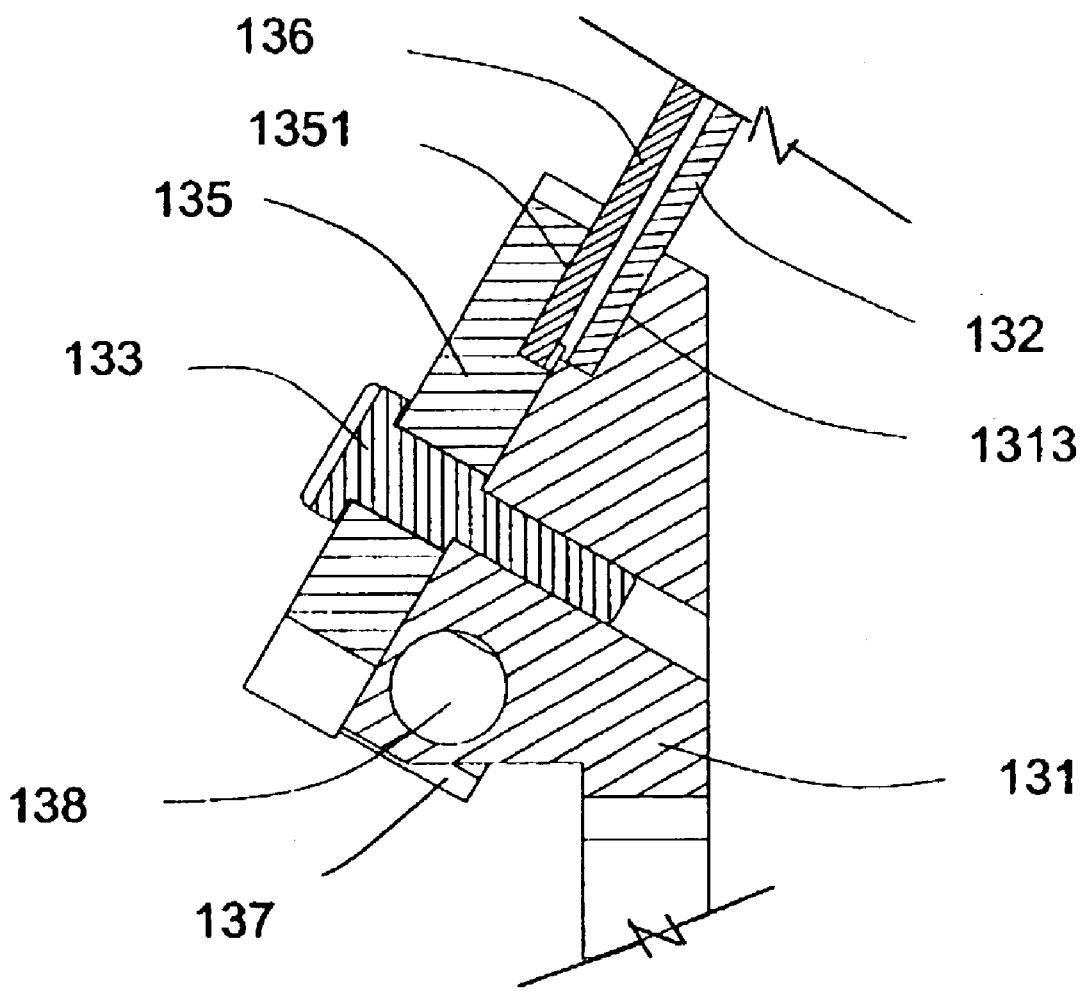
FIG. 3 is a cross-sectional diagram of the cross-section A—A of the prior-art polarizer module of FIG. 2.
Figure 4:
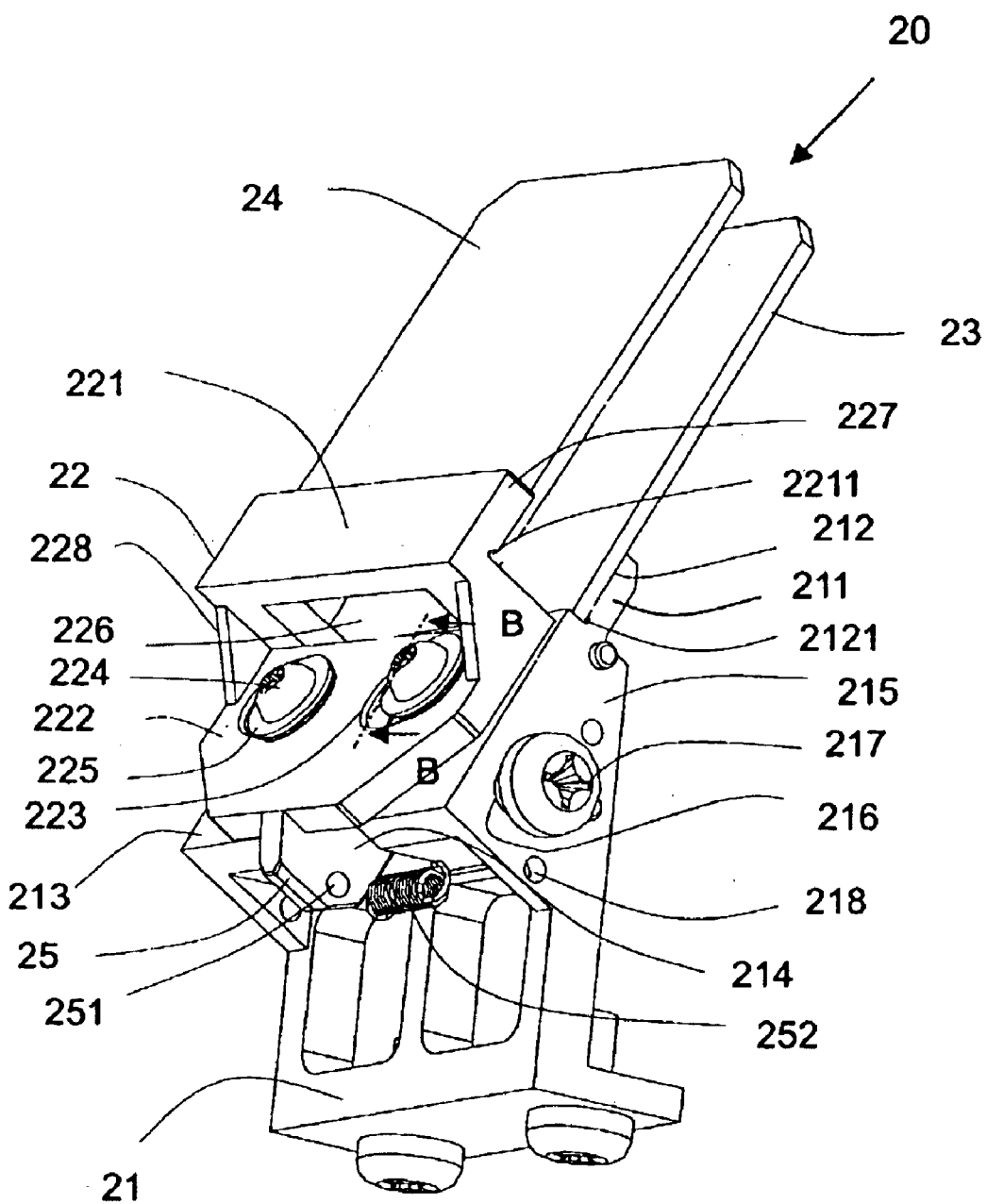
FIG. 4 is a perspective view of the polarizer module according to the present invention.
Figure 5:
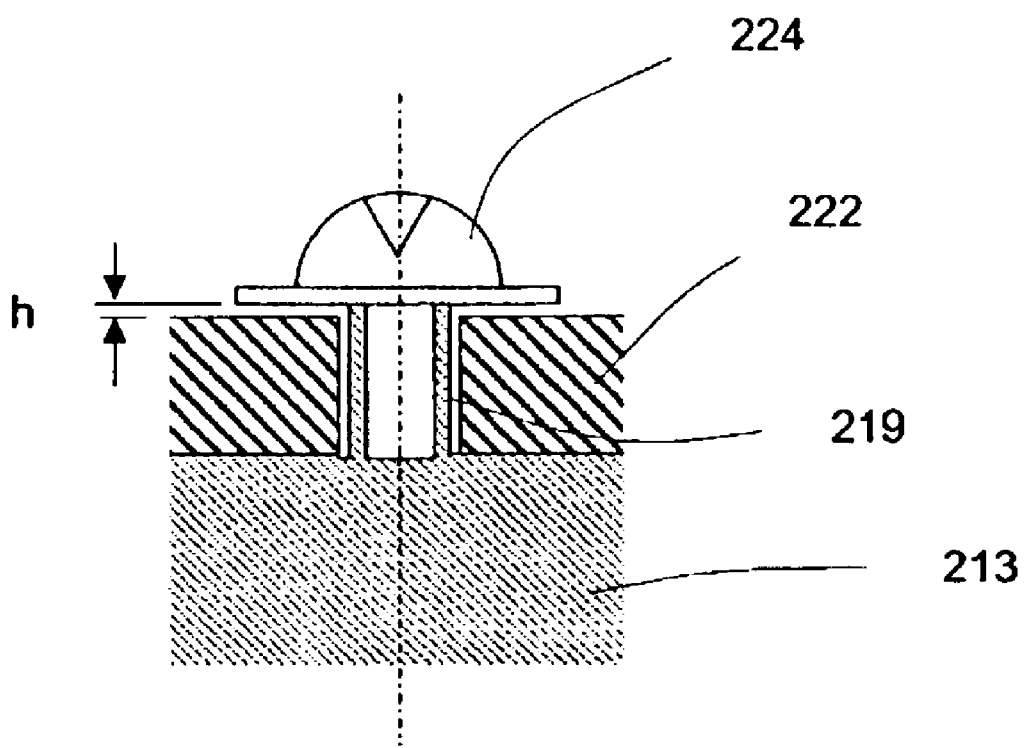
FIG. 5 is a cross-sectional diagram of the cross-section B—B of the fixing bolt of the present invention.

Please refer to FIGS. 4 and 5 for a preferred embodiment of the present invention. The polarizer module 20 comprises a base 21, a fixed base 22, a polarizer 23, a half-wave plate 24, and an adjusting mechanism 25, wherein the fixed base 22 is disposed on the base 21, the polarizer 23 is glued onto the top of the base 21, and the half-wave plate 24 also glued relatively onto the top of the fixed base 22. By means of adjusting the adjusting mechanism 25 on the lower side of the fixed base 22, the half-wave plate 24 is adjusted to the optimal polarization position.

The base 21 is L-shaped, having a flange plate 211 extending upward from the top of the base 21. The upper surface of the flange plate 211 and the top of the base 21 define a supporting surface 212 and form a cove 2121 at their interaction position, and one end of the polarizer 23 is glued the supporting surface 212. Further, an aslant surface 213 is disposed on the upper side of the base 21, and a sleeve screw 219 is protruded each from both sides of the center proximate the aslant surface 213; a recess 214 is disposed at the center of the lower surface of the aslant surface 213; a screw hole 216 is disposed on one side 215 of the base 21 proximate the bottom of the aslant surface 213, which connects to the recess 214 and secured with an adjusting bolt 217 and the rear end protrudes from the side of the recess 214; a hole 218 is disposed on the side 215 of the base 21 proximate to the end of the adjusting bolt 217.

Further, a Z-shaped fixed base 22 is disposed on the aslant surface 213 of the base 21, and the Z-shaped fixed base 22 comprises an upper base 221 and a lower base 222, two slots 223 disposed at appropriate positions of the lower base 222, and slots 223 receive the sleeve screw 219 so that the height of the sleeve screw 219 slightly protrudes from the upper surface of the lower base 222 and secured onto the aslant surface 213 by two fixing bolts 224 together with washers 225 such that the washer 225 keeps a small distance h from the upper surface of the lower base 222 and limits the fixed base 22 on the aslant surface 213 to avoid touching and driving the upper surface of the lower base 222 while securing the fixing bolts 224 and affecting the positioning of the half-wave plate 24. The standard screw bolts and washers sold in the market can be used to substitute the tailored made sectional screws of the prior art to simplify the complexity of components. An adjusting mechanism 25 is disposed on the lower side of the lower base 222, and the adjusting mechanism 25 protruded downward from the center of the lower side of the lower base 222 extends into the recess 214 and props the rear end of the adjusting bolt 217 with one side, and one end protrudes from the recess 214 and has a hole 251. An elastic member 252 having both ends hanging into the holes 218 and 251; two supports 228 are extended upward from both sides of the front end of the lower base 222 forming an air duct 226 between the two supports 228, and the upper end of the support 228 is connected to the upper base 221, and a cove 2211 is formed at their intersection; the upper base 221 is relatively parallel to the flange plate 211, forming a flange 227 downward from the end surface on both sides. The flange 227, the lower side of the upper base 221, and the support 228 form a three-dimensional supporting surface; one end of the half-wave plate 24 is exactly glued on the supporting surface, and disposed at a position relative to the polarizer 23.

Figure 6:
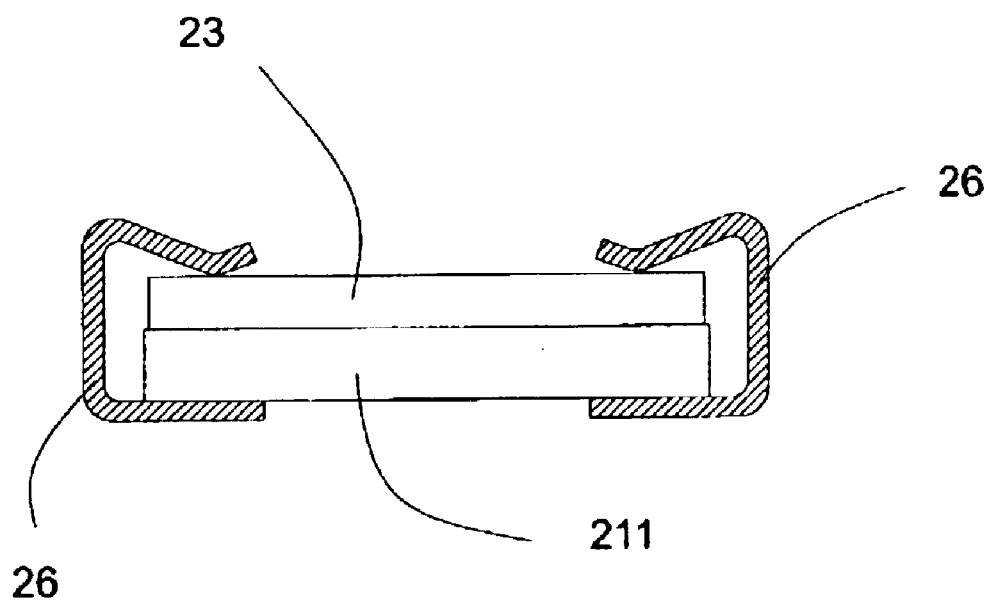
FIG. 6 is a cross-sectional diagram of the polarizer module of the present invention being installed and held into its position.

When the polarizer module 20 of the preferred embodiment of the present invention is assembled, an end of the polarizer 23 is placed on the supporting surface 212 on the upper side of the flange plate 211. By the cove 2121, the end surface of the polarizer 23 can be aligned easily with the supporting surface 212, and a fixing clip 26 can clip the polarizer 23 and the flange plate 211 from both sides through the non-aslant structure of the lower surface of the flange plate 211 for gluing as shown in FIG. 6. The present invention overcomes the shortcoming of the prior art that the aslant surface of the prior-art polarizer module cannot be clipped and fixed easily. In addition, the flange 227, the lower side of the upper base 221, and the support 228 form a three-dimensional supporting surface and a cove 2211 that allows the half-wave plate 24 to be quickly and accurately positioned to reduce the manufacturing time of positioning the two-dimensional supporting surface of the prior art, and similarly the half-wave plate 24 and the upper base 221 is clipped together by the fixing clip 26 and then glued together. Since the Z-shaped fixed base 22 lifts up the half-wave plate 24 to increase the distance from the polarizer 23, and keeps an air duct 226 in the gap so that the air can pass through the half-wave plate 24 and the polarizer 23 to improve the heat dispersion effect and maintain the appropriate operating temperature of the optical components to extend the life of use and solve the problems of having a short distance between the half-wave plate 24 and the polarizer 23 that causes poor heat dispersion.

Further, the present invention could use a single adjusting bolt 217 for the rotation, so that the elastic member 252 pulls the adjusting mechanism 25 to attach onto the rear end of the adjusting bolt 217 and moves as the rear end of the adjusting bolt 217 contracts and drives the Z-shape fixed base 22 to rotate under the limitation of the two slots 223. The planar angle of the half-wave plate 24 is adjusted to obtain the optimal polarization position. Such arrangement can simplify the complicated procedure of adjusting the screw bolts on both sides of the prior-art polarizer module.

Similarly, the flange plate 211 can also form a flange on both sides of the supporting surface 212 to define a three-dimensional positioning surface such that the polarizer 23 can be positioned easily.

The present invention has been described using exemplary preferred embodiments. It will be obvious that the same may be varied in many ways. Such variations are not to be regarded as a departure from the spirit and scope of the invention, and all such modifications and arrangements as would be obvious to one skilled in the art are intended to be included within the scope of the following claims.

What is claimed is:

1. A polarizer module, comprising:

a base;

a polarizer coupled on the top of the base;

a fixed base comprising an upper base, a lower base, and an air duct between the upper base and the lower base, and the lower base being fixed on the base; and a half-wave plate, disposed on the upper base face-to-face with the polarizer.

2. The polarizer module of claim 1, wherein the base is L-shaped, having a flange plate extended from the top of the base, and defining a supporting surface by an upper surface of the flange plate and the upper surface of the base for gluing with an end of the polarizer.

3. The polarizer module of claim 2, wherein the flange plate forms a flange disposed upward from both ends of the supporting surface of the flange plate.

4. The polarizer module of claim 1, wherein the base has an aslant surface on one side, a sleeve screweach protruded from both sides at the center of the aslant surface, two slots disposed on the lower base respectively receiving the sleeve screw, and the height of the sleeve screwslightly protruding from the upper surface of the lower base, and two fixing bolts with washers being secured onto the sleeve screw.

5. The polarizer module of claim 4, wherein a recess is disposed at the center of the lower surface of the aslant surface, and an adjusting mechanism is protruded from the lower side of the lower base to extend into the recess.

6. The polarizer module of claim 5, wherein the base has a screw hole on one side secured by an adjusting bolt and its rear end protruded from one side of the recess to prop against a side of the adjusting mechanism, an elastic member having both ends respectively coupled to a side of the base and a hole of the adjusting mechanism.

7. The polarizer module of claim 1, wherein the air duct is comprised of two supports extending upward from both sides of the front end of the base, and the top of the supports being coupled with the upper base.

8. The polarizer module of claim 1, wherein the upper base comprises a flange extended downward from both sides of the upper base.

* * * * *